United States Patent [19]

Welch

[11] Patent Number: 5,400,651
[45] Date of Patent: Mar. 28, 1995

[54] APPARATUS FOR INTERFACE MEASUREMENT IN A STORAGE TANK

[75] Inventor: Michael Welch, Chester, United Kingdom

[73] Assignee: Shell Oil Company, Houston, Tex.

[21] Appl. No.: 252,142

[22] Filed: Jun. 1, 1994

Related U.S. Application Data

[63] Continuation of Ser. No. 64,529, May 20, 1993, abandoned.

[30] Foreign Application Priority Data

May 28, 1992 [EP] European Pat. Off. ............ 92304822

[51] Int. Cl.⁶ .............................................. G01F 23/28
[52] U.S. Cl. ................................. 73/290 R; 73/304 R; 324/643; 324/644
[58] Field of Search ..................... 73/290 R, 304 R; 324/643, 644

[56] References Cited

U.S. PATENT DOCUMENTS

| | | | |
|---|---|---|---|
| 3,398,578 | 8/1968 | Dozer | 73/304 R |
| 3,424,002 | 1/1969 | Johnson | 73/290 R |
| 3,474,337 | 10/1969 | Petrick | 324/644 |
| 3,703,829 | 11/1972 | Dougherty | 73/290 R |
| 3,812,422 | 5/1974 | De Carolis | 73/304 R |
| 3,853,005 | 12/1974 | Schendel | 73/304 R |
| 3,922,914 | 12/1975 | Fuchs | 324/643 |
| 3,995,212 | 11/1976 | Ross | 73/304 R |
| 4,135,397 | 1/1979 | Krake | 73/304 R |
| 4,359,902 | 11/1982 | Lawless | 73/290 R |
| 4,489,601 | 12/1984 | Rao et al. | 324/643 |
| 4,589,281 | 5/1986 | Aldrich | 73/290 R |
| 4,720,997 | 1/1988 | Doak et al. | 73/304 R |
| 4,736,622 | 4/1988 | Miller et al. | 73/304 R |
| 4,786,857 | 11/1988 | Mohr et al. | 73/304 R |
| 4,833,918 | 5/1989 | Jean et al. | 324/643 |

FOREIGN PATENT DOCUMENTS

| | | | |
|---|---|---|---|
| 0147152 | 3/1981 | Germany | 73/304 R |
| 1144345 | 3/1969 | United Kingdom | 324/644 |
| 0267108 | 4/1970 | U.S.S.R. | 73/304 R |

OTHER PUBLICATIONS

"Levels Systems," *Process Instruments and Handbook*, 3rd. Ed., Douglas M. Considine, Ed., McGraw-Hill, pp. 5.44–5.53. (no date).

*Primary Examiner*—Diego F. F. Gutierrez
*Attorney, Agent, or Firm*—Fred S. Reynolds, Jr.

[57] ABSTRACT

An apparatus and method for measuring the water level at the bottom of a storage tank, the water level being the product-water interface between product and water within the storage tank. The apparatus includes a sensor assembly which is located at the tank bottom. The assembly has a plurality of measurement sensors arranged in a housing having slots for product and water to enter and leave the housing. Each measurement sensor is an open-circuited co-axial transmission line with a probe at its open end which functions as a monopole antenna. In preferred embodiments, the transmission lines are quarter wavelength open-circuited coaxial transmission lines. Each probe is located at a different distance from the tank bottom to cover a measurement range. The transmission lines are excited with signals which are reflected by the probes. As the level of the product-water interface changes on the probes, the capacitance of the probes also change which, in turn, change the amplitude or voltage level of the reflected signals. The voltage measurements are converted to level by a microprocessor.

18 Claims, 3 Drawing Sheets

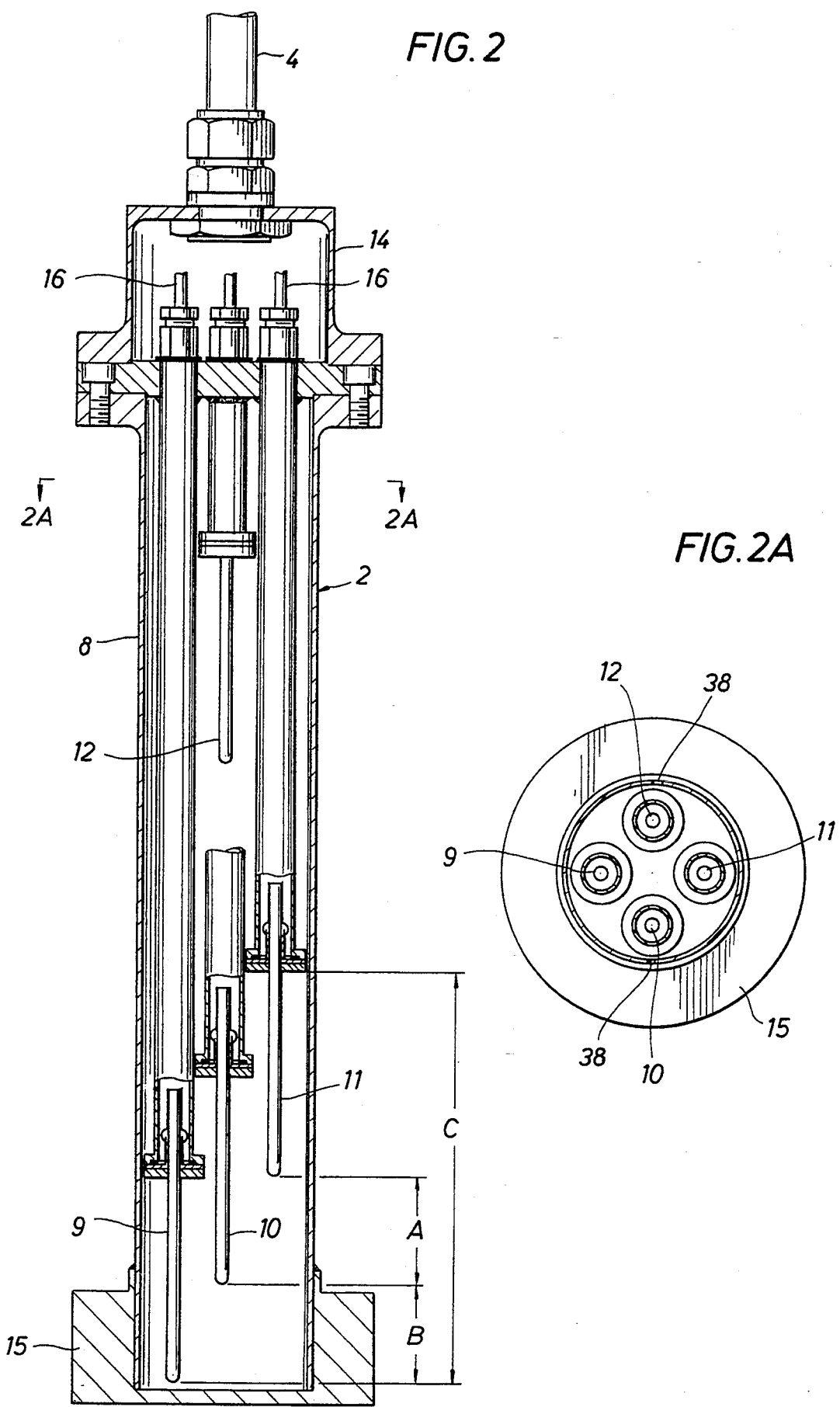

APPARATUS FOR INTERFACE MEASUREMENT IN A STORAGE TANK

This is a continuation of application Ser. No. 08/064,529, filed May 20, 1993, now abandoned.

BACKGROUND OF THE INVENTION

1. Field of the Invention

The invention relates to an apparatus for interface measurement in a storage tank. In particular, the invention relates to an apparatus for continuously monitoring the water level at the bottom of a product storage tank.

2. Description of the Related Art

Many methods and techniques exist to detect an interface between product and water (herein referred to as a product-water interface), but due to the abrupt change in dielectric constant, capacitance techniques are most commonly employed. The drawback with using capacitance is that to provide adequate resolution, precise measurements are often necessary. This necessitates either careful circuit design or sophisticated signal processing which can be expensive and complex to implement.

Further, it is known to apply a co-axial transmission line to determine liquid-level in a tank. Electrical pulses are applied at the line input. Changes in dielectric constant that result from the interface, cause the pulses to be reflected back to the line-input and from the measured reduction in pulse length, the liquid level is calculated. However, the measurement accuracy of this known system is limited by the need to make precision high speed measurements.

SUMMARY OF THE INVENTION

It is therefore an object of the invention to provide a cheap and simple apparatus for continuously measuring the water level at the bottom of a storage tank.

It is also an object of the invention to provide a method for determining the location of a product-water interface from the bottom of a storage tank.

The invention therefore provides an apparatus for measuring the water level at the bottom of a storage tank, comprising a sensor assembly adapted to be located at the tank bottom, said assembly comprising a plurality of measurement sensors arranged in a housing provided with slots for entering or leaving product and/or water, each measurement sensor comprising an open-circuited quarter wave co-axial transmission line, comprising at its open end a monopole antenna or probe, said probe being surrounded with an insulated material and further comprising means for exciting the transmission line.

The apparatus of the invention makes use of the properties of an open-circuited transmission line to act as a resonant transformer to produce a voltage whose amplitude is related to the position of the product-water interface along the length of the monopole antenna or probe. Small changes in capacitance which result from the interface are transformed into much larger voltage changes at the sending end which are more easily measured. Advantageously, the probe length is less than 1/10 of the wavelength used to excite the transmission line. This wavelength will also be referred to herein as an excitation wavelength.

A microprocessor compares the voltage measurements with a preprogrammed look-up table to determine water level or the product-water interface level.

These and other objects and advantages of the present invention will become apparent to those of skill in the art after having read the following detailed description of the preferred embodiments which are contained herein and illustrated by the various figures.

The invention encompasses the heretofore described embodiments as well as other embodiments as are described and as will be apparent to those of skill in the art.

BRIEF DESCRIPTION OF THE DRAWINGS

FIG. 2 represents the sensor assembly of the system of FIG. 1.

FIG. 2A is a cross-section of FIG. 2 showing the location of sensors within the sensor assembly.

DESCRIPTION OF EMBODIMENTS

Figure 1:
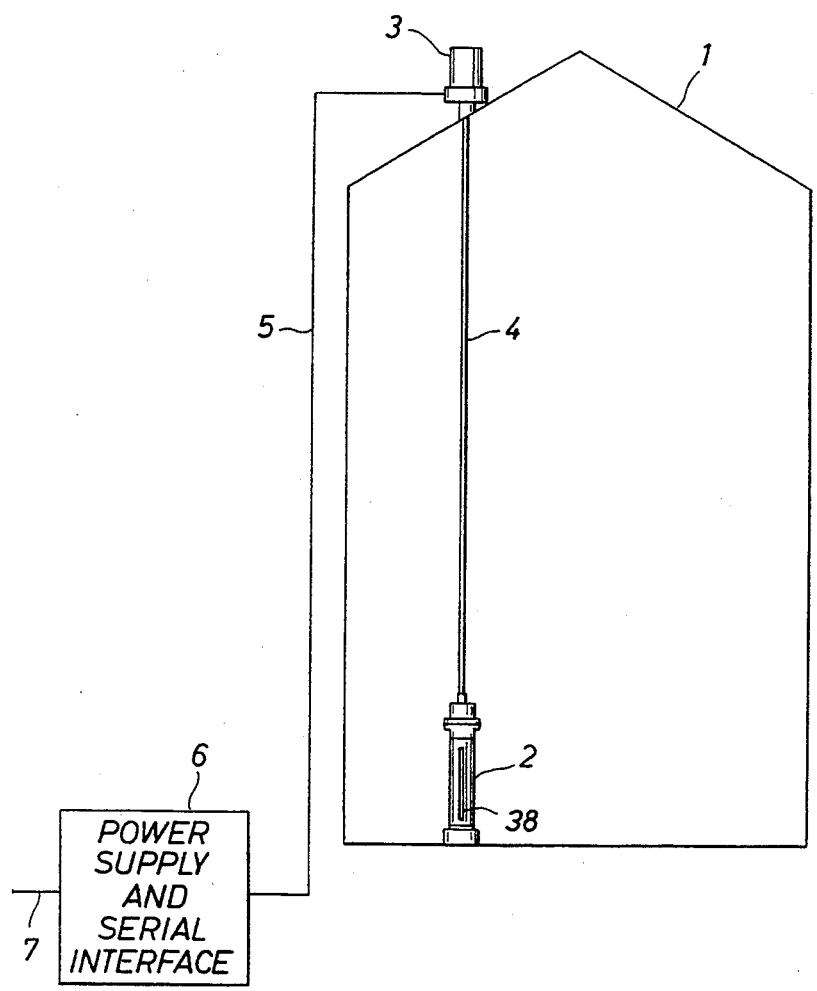
FIG. 1 represents schematically a system for measuring water level at the bottom of a product storage tank wherein the apparatus of the invention is applied.

Referring now to FIG. 1, a storage tank 1 has been shown.

The apparatus for measuring water level at the bottom of the tank 1 comprises a sensor assembly 2 connected to signal processing electronics 3.

The sensor assembly 2 comprises a plurality of sensors and is designed to be located at the tank bottom, e.g. by means of a winch and guide assembly (not shown for reasons of clarity) and communicates by any suitable connection 4, e.g. via a stainless steel tube with the processing electronics 3 mounted at the tank top.

The processing electronics 3 is connected in any suitable manner (e.g. an armored cable 5) to an intrinsically safe power supply and serial interface 6.

Information from power supply and serial interface 6 can be transmitted via any suitable line 7 to a host computer (not shown for reasons of clarity).

In FIG. 2 the sensor assembly 2 has been shown in a partially transparent longitudinal section.

A sensor body 8 is provided with a plurality of slots 38 (as shown in FIGS. 1 and 2) to enable product and water to enter and/or leave the sensing area.

The sensor body 8 is connected in any mechanical way suitable for the purpose to the connection 4 shown in FIG. 1. Such mechanical details are known to those skilled in the art and will not be described in detail.

In one preferred embodiment, there are four sensors (9, 10, 11, 12), each having a length of approximately 100 mm in contact with the product and/or water, the lower three (9, 10, 11) being measurement sensors spaced vertically approximately 50 mm apart (distances A and B in FIG. 2).

The measurement range of this preferred embodiment is approximately 200 mm and it is represented by C in FIG. 2.

The fourth sensor 12 is a reference sensor, located above the water interface and preferably within the product to which the level of the product-water interface is to be determined. Further, a top cover 14 and a base unit 15 are shown.

FIG. 2A is a cross-section taken at section 2A–2A from FIG. 2 looking toward base unit 15. It shows the placement of the sensors (9, 10, 11, 12) within the sensor assembly.

Returning to FIG. 2, each sensor (9, 10, 11, 12) is connected to its own co-axial cable 16 (only two being shown for reasons of clarity) which via the connection 4 in any suitable manner are connected to the electronics on top of the tank.

For reasons of clarity mechanical connection details are not represented fully.

In this preferred embodiment, the number of measurement sensors is three; however in the practice of the invention, any number of measurement sensors may be used. In some embodiments, some measurement sensor comprises an open-circuited quarter wave co-axial transmission line.

Figure 3:
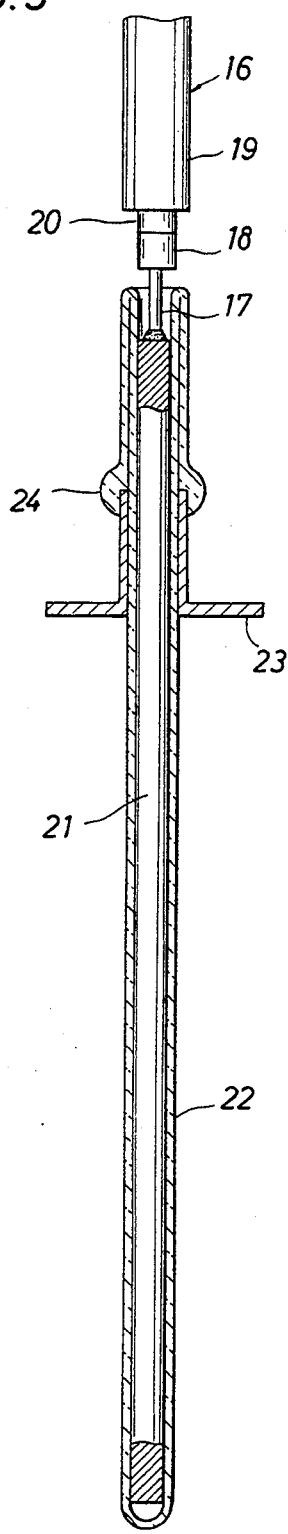
FIG. 3 represents part of a sensor of the sensor assembly of FIG. 2.

FIG. 3 represents a longitudinal section of part of a sensor of the embodiment shown in FIG. 2.

The co-axial transmission line 16 comprises a center conductor (17), an inner protective covering 18, an outer protective covering 19 and a braided screen 20. In order to increase the capacitive coupling and hence sensitivity, the center conductor 17 is extended by attaching a monopole antenna or probe 21. The outer braid of the co-axial line is removed from the end section of the line, the monopole antenna or probe is attached to the center (inner) conductor and the inner conductor and probe are covered by a non-conductive coating, i.e., surrounded by insulated material. In the embodiment of FIG. 3, the active area (the probe and exposed inner conductor) is insulated e.g. by a glass pocket 22. Further, a suitable seal 23 is represented.

This is attached to the glass pocket by a glass to metal seal 24. In highly preferred embodiments, the length of the co-axial cable is an odd multiple of the excitation wavelength divided by four. Advantageously, in preferred embodiments, the braid is removed over a length much smaller (e.g. less than 1/10) than the wavelength used to excite the transmission line thus, the total length between the tip of the probe and the end of the outer braid should be less than 1/10 of the excitation wavelength.

Provided the probe length is less than 1/10 of the wavelength used to excite the transmission line, no appreciable radiation field exists.

In fulfilling the above, only localized measurements are made as the field is contained within a relatively small sample volume.

The operation of the apparatus of the invention is as follows.

As already indicated hereinbefore, the apparatus of the invention is based upon the properties of an open-circuited transmission line which acts as a resonant transformer to produce a voltage (or signal) whose amplitude is related to the position of the product-water interface along the length of the probe. Small changes in capacitance which result from the interface are transformed into much larger voltage (signal) changes at the sending end which are easily measured. Advantageously, file apparatus of the invention is operated in the frequency range of 10 MHz to 100 MHz.

Transmission lines are known as such to those skilled in the art and the general operation thereof will therefore not be described in detail.

Generally, it can be said that the; signals which indicate the interface level are transmitted along the transmission line and are reflected at the surface of the fluid interface, due to a change in dielectric constant. The reflected signals are processed further in order to obtain voltage measurements indicating level.

Calibration data is obtained in any suitable manner. For example, by lowering the sensor assembly 2 through the product interface during installation, recording the sensor outputs and copying them into an appropriate look-up table.

When the antenna or probe is immersed in a fluid, its impedance is related to the complex permittivity of that fluid. If it is assumed that the impedance is reactive, which is a reasonable assumption considering its construction, then the phase shift induced on the transmission line is proportional to the reactance (which is capacitive) appearing at the open-circuit. The equivalent circuit is that of a transmission line terminated by a capacitor, the value of the capacitor being determined by the probes radiating geometry, and the complex permittivity of the medium surrounding the probe.

Figure 4:
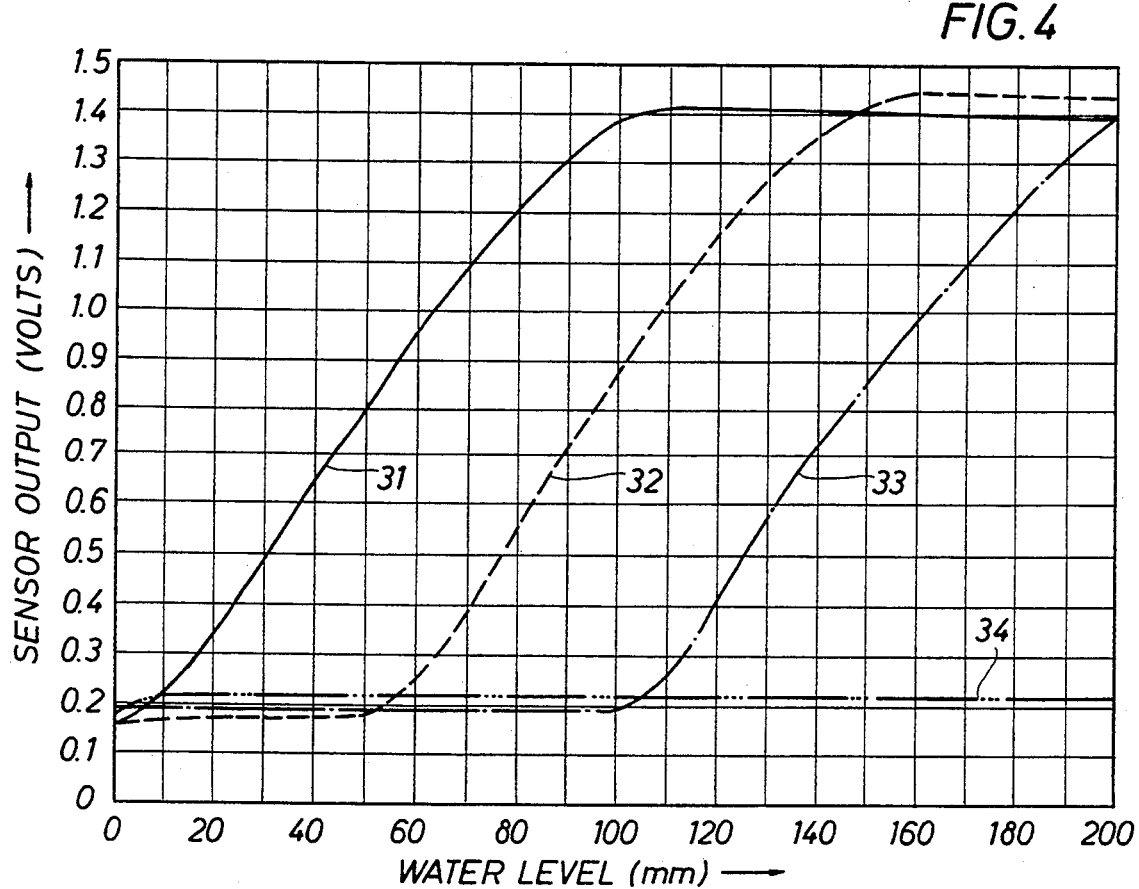
FIG. 4 represents sensor output voltage versus product-water interface level.

As an example of how one embodiment of the invention may work, FIG. 4 shows the variation in measuring sensor output for an oil-water interface as a function of measuring sensor immersion for the preferred embodiment of FIG. 2. Curves 31, 32, and 33 represent the measured voltage output (signal amplitude) respectively for measuring sensors 9, 10, and 11 and Curve 34 is the voltage output for reference sensor 12 which is located above the product-water interface in this particular embodiment. As can be observed in the FIG., as the level of the product-water interface rises along the length of a probe which is exposed to the product and/or the water, the signal reflected from the probe increases.

Figure 5:
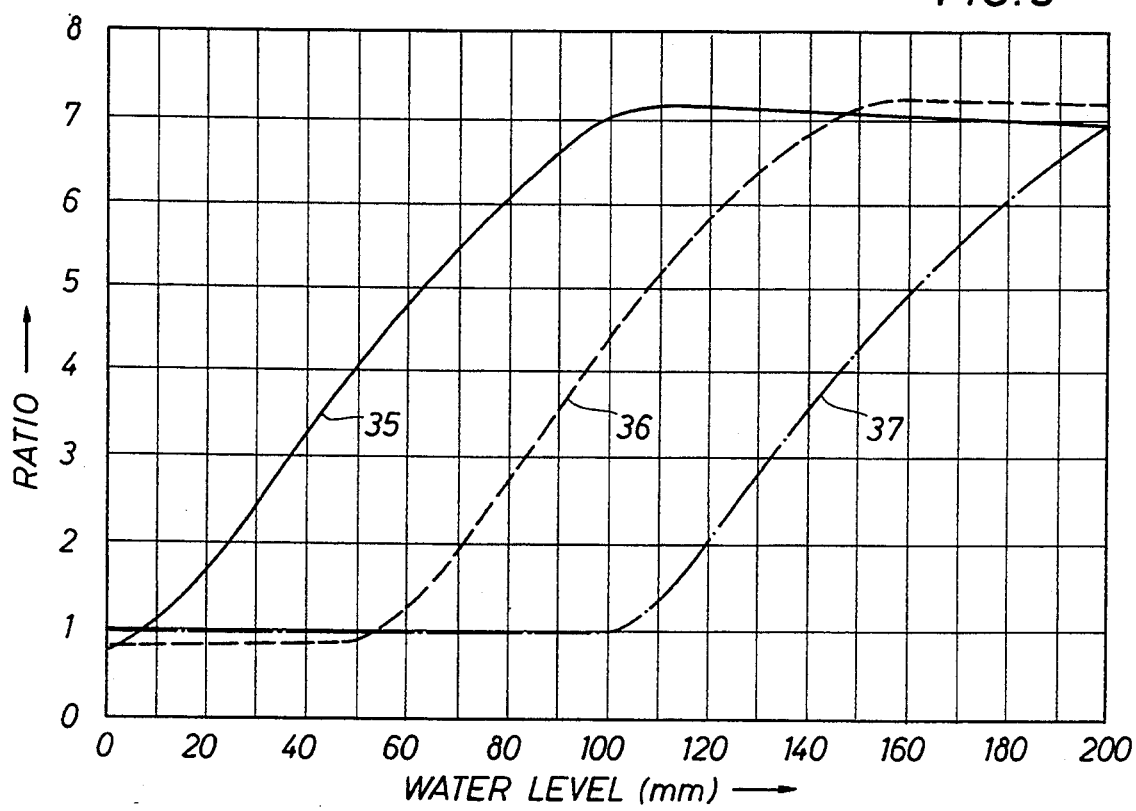
FIG. 5 represents on one axis the ratio representing the measuring sensor voltage divided by a reference sensor voltage and on the other axis the product-water interface level.

FIG. 5 shows the result of dividing the output of each measuring sensor of FIG. 4 by the output of the reference sensor 12. This enables this embodiment of the invention to compensate for changes in product composition and temperature effects. Curves 35, 36, and 37 represent the corresponding ratios respectively for the outputs of measuring sensors 9, 10, and 11 divided by the output of reference sensor 12 as shown in FIG. 4.

Information taken from characteristics shown in either of these FIGS. 4 and 5 may form a look-up table which is used by a host computer program to determine the interface level. If available memory in the target computer is a problem, the individual characteristics are sufficiently similar to enable overlaying.

Various modifications of the invention will become apparent to those skilled in the art from the foregoing description and accompanying drawings. Such modifications are intended to fall within the scope of the appended claims.

What is claimed is:

1. An apparatus for measuring the water level at the bottom of a storage tank, the water level being the product-water interface between product and water within the storage tank, the apparatus comprising:

a sensor assembly adapted to be located at the tank bottom, said assembly having a plurality of measurement sensors arranged in a housing provided with slots for product and water to enter and leave the housing;

each measurement sensor comprising an open-circuited quarter wave co-axial transmission line having at its open end a probe, the probe being surrounded with an insulated material and functioning as a monopole antenna, each probe being arranged at a different height within the housing to cover a measurement range;

a means for exciting each transmission line with signals having an excitation wavelength; and a means for determining the water level from amplitudes of signals reflected from each probe by comparing each reflected signal's amplitude with a look up table, the look up table providing the water level corresponding to the amplitudes of the reflected signals.

2. The apparatus as claimed in claim 1 wherein the plurality of measurement sensors includes at least 3 measurement sensors.

3. The apparatus as claimed in claim 1 also comprising:

a reference sensor, the reference sensor being included in the sensor assembly and located such that it is above the product-water interface;

the reference sensor also comprising an open-circuited quarter wave co-axial transmission line having at its open end a probe, the probe being surrounded with an insulated material and functioning as a monopole antenna;

wherein the means for exciting each transmission line also excites the reference sensor's transmission line with signals having an excitation wavelength;

wherein the means for determining the water level divides the amplitude of each signal reflected from the measurement sensors' probes by an amplitude of a signal reflected from the reference sensor's probe to obtain a ratio for each of the measurement sensors' reflected signals and compares each ratio with a ratio look up table, the ratio look up table providing the water level corresponding to the ratios of the signals reflected by the measurement sensors' probes.

4. The apparatus as claimed in claim 1 also comprising:

an outer braid which is included in each co-axial line, the outer braid being removed from the end section of each line;

an inner conductor which is also included in each co-axial line, the probe being attached to the inner conductor; and wherein the insulated material is a glass pocket which covers the inner conductor and the probe.

5. The apparatus as claimed in claim 4 wherein the total length between the end of the outer braid and the probe's tip is less than 1/10 of the excitation wavelength.

6. The apparatus as claimed in claim 1 wherein the length of each co-axial line is an odd multiple of the line's excitation wavelength divided by four.

7. The apparatus as claimed in claim 1 wherein the excitation wavelength on each co-axial transmission line has an operating frequency of between 10 MHz and 100 MHz.

8. The apparatus as claimed in claim 1 wherein the probe length is less than 1/10 of the excitation wavelength.

9. A method for measuring the water level at the bottom of a storage tank, the water level being the product-water interface between product and water within the storage tank, the method comprising the following steps:

(a) exciting a plurality of open-circuited quarter wave co-axial transmission lines with signals in each transmission line, each transmission line having at its open end a probe surrounded with an insulated material, each probe having been positioned within the storage tank with a different height with respect to the bottom of the tank such that at least one of the probes has a portion of that probe in contact with the product-water interface;

(b) reflecting the signals from the probes; and (c) determining from different voltage amplitudes of the reflected signals the product-water interface level in the storage tank by comparing each reflected signal's amplitude with a look up table, the look up table providing the product-water interface level corresponding to the amplitudes of the reflected signals.

10. The method of claim 9 wherein the signals of step (a) have an excitation wavelength that is related to the co-axial line's length such that the length of each line is an odd multiple of the signal's excitation wavelength on that line divided by four.

11. The method of claim 9 wherein the signals of step (a) have an excitation wavelength in each line that has a frequency between 10 MHz and 100 MHz.

12. The method of claim 9 wherein the signals of step (a) have an excitation wavelength in each line which is at least 10 times greater than the length of each probe.

13. An apparatus for measuring the water level at the bottom of a storage tank, the water level being the product-water interface between product and water within the storage tank, the apparatus comprising:

a sensor assembly adapted to be located at the tank bottom, said assembly having a plurality of measurement sensors arranged in a housing provided with slots for product and water to enter and leave the housing;

each measurement sensor comprising an open-circuited co-axial transmission line having at its open end a probe, the probe being surrounded with an insulated material and functioning as a monopole antenna, each sensor being arranged at a different height within the housing to cover a measurement range;

a means for exciting each transmission line with signals; and a means for determining the water level from amplitudes of signals reflected from each probe by comparing each reflected signal's amplitude with a look up table, the look up table providing the water level corresponding to the amplitudes of the reflected signals.

14. The apparatus as claimed in claim 13 wherein the plurality of measurement sensors includes at least 3 measurement sensors.

15. The apparatus as claimed in claim 13 also comprising:

a reference sensor, the reference sensor being included in the sensor assembly and located such that it is above the product-water interface; and the reference sensor also comprising an open-circuited co-axial transmission line having at its open end a probe, the probe being surrounded with an insulated material and functioning as a monopole antenna;

wherein the means for exciting each transmission line also excites the reference sensor's transmission line;

wherein the means for determining the water level divides the amplitude of each signal reflected from the measurement sensors' probes by an amplitude of a signal reflected from the reference sensor's probe to obtain a ratio for each of the measurement sensors' reflected signals and compares each ratio with a ratio look up table, the ratio look up table providing the water level corresponding to the ratios of the signals reflected by the measurement sensors' probes.

16. A method for measuring the water level at the bottom of a storage tank, the water level being the product-water interface between product and water within the storage tank, the method comprising the following steps:

(a) exciting a plurality of open-circuited co-axial transmission lines with signals in each transmission line, each transmission line having at each of its open ends a probe surrounded with an insulated material, each probe having been positioned within the storage tank with a different height with respect to the bottom of the tank such that at least one of the probes has a portion of that probe in contact with the product-water interface;

(b) reflecting the signals from the probes; and (c) determining from different voltage amplitudes of the reflected signals the product-water interface level in the storage tank by comparing each reflected signal's amplitude with a look up table, the look up table providing the product-water interface level corresponding to the amplitudes of the reflected signals.

17. The method of claim 16 wherein the signals of step (a) have an excitation wavelength in each transmission line that corresponds to a frequency between 10 MHz and 100 MHz.

18. The method of claim 16 wherein the signals of step (a) have an excitation wavelength in each transmission line that is at least 10 times greater than the length of the probe on the transmission line.

* * * * *